US009353331B2

(12) United States Patent
Dasari et al.

(10) Patent No.: US 9,353,331 B2
(45) Date of Patent: May 31, 2016

(54) METHOD TO RECOVER FREE FATTY ACIDS FROM FATS AND OILS

(71) Applicant: Riverhead Resources, LLC, Pleasant Hill, IA (US)

(72) Inventors: Mohan Prasad A. Dasari, West Des Moines, IA (US); Kidron Joel Knox, Ankeny, IA (US)

(73) Assignee: RRIP, LLC, Pleasant Hill, IA (US)

( * ) Notice: Subject to any disclaimer, the term of this patent is extended or adjusted under 35 U.S.C. 154(b) by 215 days.

(21) Appl. No.: 14/079,059

(22) Filed: Nov. 13, 2013

(65) Prior Publication Data

US 2014/0135515 A1    May 15, 2014

Related U.S. Application Data

(60) Provisional application No. 61/725,598, filed on Nov. 13, 2012, provisional application No. 61/793,727, filed on Mar. 15, 2013.

(51) Int. Cl.
C11B 3/00 (2006.01)
C11B 3/04 (2006.01)
C11B 7/00 (2006.01)

(52) U.S. Cl.
CPC ... *C11B 3/04* (2013.01); *C11B 3/00* (2013.01); *C11B 7/0008* (2013.01); *C11B 7/0066* (2013.01)

(58) Field of Classification Search
CPC ........................................................ C11B 3/04
USPC ........................................................ 554/212
See application file for complete search history.

(56) References Cited

U.S. PATENT DOCUMENTS 2,794,035 A    5/1957   Hummel
3,455,785 A    7/1969   Butt
(Continued)

FOREIGN PATENT DOCUMENTS

EP    1 298 192    4/2003
GB      427680    4/1935
(Continued)

OTHER PUBLICATIONS

Erickson, David R., Practical Handbook of Soybean Processing and Utilization, published by American Oil Chemists Society in the United States (Illinois/Missouri), pp. 198-199,dated 1995.
(Continued)

*Primary Examiner* — Deborah D Carr
(74) *Attorney, Agent, or Firm* — Brick Gentry PC; Brian J. Laurenzo; Jessica L. Susie (57) ABSTRACT

Methods for recovering free fatty acids from fats and oils having high free fatty acid content are provided. In the method, fats and oils are treated with a mixture having an alcohol to result in a low-free fatty acid oily phase and an alcohol phase. The mixture may also include an alkali. The alcohol may be a monohydric alcohol and an aqueous alcohol, such as an aqueous alcohol having a concentration of at least about 15% alcohol by weight. The alcohol phase may be treated with an acid to form an aqueous alcohol phase and a lipid alcohol phase, wherein the lipid alcohol phase includes free fatty acids, which may be recovered. Fats and oils amenable to such a method may include, but are not limited to, waste fats, waste oils, high acid grease, high acid tallow, and corn oil, such as corn oil produced at an ethanol production plant.

24 Claims, 4 Drawing Sheets

(56) References Cited

U.S. PATENT DOCUMENTS

| | | |
|---|---|---|
| 3,640,980 A | 2/1972 | Baba |
| 3,754,377 A | 8/1973 | Clonts |
| 3,758,404 A | 9/1973 | Clonts |
| 3,839,487 A | 10/1974 | Clonts |
| 3,977,829 A | 8/1976 | Clonts |
| 3,992,156 A | 11/1976 | Clonts |
| 4,130,549 A | 12/1978 | Ueno |
| 4,491,565 A | 1/1985 | Verachtert |
| 4,703,060 A | 10/1987 | Traitler et al. |
| 4,754,089 A | 6/1988 | Matson et al. |
| 5,306,831 A | 4/1994 | Beshouri et al. |
| 5,523,426 A | 6/1996 | Jubin, Jr. et al. |
| 5,525,126 A | 6/1996 | Basu |
| 5,605,635 A | 2/1997 | David |
| 5,705,074 A | 1/1998 | Brient |
| 5,904,849 A | 5/1999 | Kim et al. |
| 5,997,731 A | 12/1999 | Suarez |
| 6,063,946 A | 5/2000 | Miller et al. |
| 6,139,723 A | 10/2000 | Pelrine |
| 6,174,501 B1 | 1/2001 | Noureddini |
| 6,300,431 B1 | 10/2001 | Want et al. |
| 6,399,802 B2 | 6/2002 | Reaney |
| 6,409,976 B1 | 6/2002 | Poschmann |
| 6,617,141 B1 | 9/2003 | Kaimal et al. |
| 6,623,604 B1 | 9/2003 | Elsasser et al. |
| 6,822,104 B2 | 11/2004 | Reaney et al. |
| 6,887,304 B2 | 5/2005 | Stroh |
| 7,112,229 B2 | 9/2006 | Khalil |
| 7,153,996 B2 | 12/2006 | Fagan |
| 7,316,728 B2 | 1/2008 | Parekh et al. |
| 7,618,544 B2 | 11/2009 | Massingill, Jr. |
| 8,003,813 B2 | 8/2011 | Wanasundara et al. |
| 8,128,825 B2 | 3/2012 | Massingill, Jr. |
| 8,192,627 B2 | 6/2012 | Gallop et al. |
| 8,361,518 B2 | 1/2013 | Sanchez Moral et al. |
| 8,481,768 B2 | 7/2013 | Sarangan et al. |
| 2005/0256425 A1 | 11/2005 | Prusiner |
| 2006/0042158 A1 | 3/2006 | Lee |
| 2009/0093648 A1 | 4/2009 | Purtle |
| 2012/0209014 A1 | 8/2012 | Massingill |

FOREIGN PATENT DOCUMENTS

| | | |
|---|---|---|
| GB | 430381 | 6/1935 |
| GB | 625674 | 11/1949 |
| GB | 596871 | 4/1951 |
| GB | 707470 | 5/1972 |
| GB | 1391906 | 4/1975 |
| WO | WO2008024716 | 2/2008 |
| WO | WO 2008024716 A2 * | 2/2008 |
| WO | WO2012140111 | 10/2012 |

OTHER PUBLICATIONS

O'Brien, Richard D., Fats and Oils Formulating and Processing for Applications, published by CRC Press in the United States, p. 77, dated 2003.

PCT International Search Report and Written Opinion of the International Searching Authority.

Pretreatment of Oils and Fats for Biodiesel, Production with GEA Westfalia Separator, GEA Mechanical Equipment/GEA Westfalia Separator brochure, pp. 1-15 (Available at least as early as Oct. 3, 2010).

Journal Article: Saponifciation of Jatorpha curcas Seed Oil: Optimization by D-Optimal Design by Jumat Salimon, Basher Mudhaffer Abdullah and Nadia Salih, www.hindawi.com/journals/ijce/2012/574780/, pp. 1-5 (2012).

High Efficiency Nondispersive Reactor for Two-Phase Reactions, Organic Process Research & Development 2008, vol. 12, No. 4, 2008, pp. 771-777.

Edible Fats and Oils Processing: Basic Principles and Modern Practices, edited by David R. Erickson, Session 9—Chapter about Corn Oil http://books.google.com/books?id=_Ib6DNiJ89IC&lpg=PP1&dq=Edible%20Fats%20and%20Oils%20Processing%3A%20Basic%20Principles%20and%20Modern%20Practices&pg=PP1#v=onepage&q=Edible%20Fats%20and%20Oils%20Processing:%20Basic%20Principles%20and%20Modern%20Practices&f=false, Copyright 1990.

Letter to the Editor, Neutral Oil Loss During Alkali Refining, by Albert J. Dijkstra, Published online: Jul. 7, 2011, Springer AOCS.

Liquid—Liquid Equilibria of Butyric Acid in Water + Solvent Systems with Trioctylamine as Extractant by Erika Sabolova, Stefan Schlosser and Jan Martak, 2001 American Chemical Society Published on Web Apr. 19, 2001.

Three-phase contractor with distributed U-shaped bundles of hollow-fibers for pertraction by Stefan Schlosser and Erika Sabolova, Journal of Membrane Science 2010 (2002) pp. 331-347.

Application of large-scale hollow fiber membrane contractors for simultaneous extractive removal and stripping of penicillin G by Z. Lazarova, B. Syska and K. Schugerl, Journal of Membrane Science 202 (2002), pp. 151-164.

Recovery and separation of organic acids by membrane-based solvent extraction and pertraction. An overview with a case study on recovery of MPCA by S. Schlosser, R. Kertesz and J. Martak, Separation Purification Technology 41 (2005) pp. 237-266, Available online at www.sciencedirect.com.

* cited by examiner

METHOD TO RECOVER FREE FATTY ACIDS FROM FATS AND OILS

CROSS-REFERENCE TO RELATED APPLICATIONS

This application claims priority from U.S. Provisional Application Ser. No. 61/725,598 filed Nov. 13, 2012 and entitled METHOD TO RECOVER FREE FATTY ACIDS FROM FATS AND OILS and from U.S. Provisional Application Ser. No. 61/793,727 filed Mar. 15, 2013 and entitled METHOD TO RECOVER FREE FATTY ACIDS FROM FATS AND OILS. The contents of U.S. Provisional Application Ser. No. 61/725,598 and U.S. Provisional Application Ser. No. 61/793,727 are hereby incorporated in their entireties by reference.

FIELD OF THE INVENTION

This invention relates generally to the removal and recovery of free fatty acids from fats and oils and specifically a method for treating high free fatty acid fats and oils to recover free fatty acids wherein the method recovers a high quantity of the free fatty acids while having a low neutral oil loss.

BACKGROUND

Some fats and oils contain high free fatty acid content, including but not limited to corn oil and waste fats and oils. As is generally known in the art, fats and oils containing a high percentage of free fatty acids are undesirable. For example, free fatty acids decrease the oxidative stability of oil. Previous methods include the refining of crude oils, which generally result in oil of low free fatty acid content. The crude oils, which have low free fatty acid content, are purified by converting the fatty acids to soaps using caustic or alkali and then separating the free fatty acid soaps, commonly referred as soapstock, from the oil. The soapstock is then treated as a waste product or used for animal feed and soap manufacturing. These methods fail to capitalize on the potential of free fatty acids as a valuable product within the fats and oils industry. For example, recovered free fatty acids may be used in feed fat supplements and to manufacture industrial products. Moreover, previous methods lead to the formation of an emulsion that entraps neutral oil, thus resulting in a high neutral oil loss. The neutral oil loss is exacerbated in the case of waste fats and oils due to the presence of high free fatty acid content. This is problematic because neutral oil is a valuable product. Accordingly, an ideal method will minimize neutral oil loss.

As provided above, fats and oils with high free fatty acids may include corn oil and waste fats and oils. For example, corn oil, including but not limited to corn oil that is produced as a byproduct of an ethanol production plant, may include at least 4% free fatty acids by weight. Other fats and oils with high free fatty acid content include high acid grease from pork plants, high acid tallow from beef plants, and waste fryer grease. Moreover, a byproduct of biodiesel production may include unreacted fats and oils with high free fatty acid content. Generally, all of these fats and oils are inedible, industrial and fall into secondary or tertiary grade fats and oils. They may have a free fatty acid content of up to 90%. Processing these fats and oils to recover the free fatty acids results in at least two valuable products: neutral oil and free fatty acids. Additionally, other impurities that are removed in the method may be valuable products.

Previous attempts have been made to remove free fatty acids from oil, particularly crude oil having low free fatty acid content. These methods have drawbacks. In particular, these methods are unsuccessful when removing free fatty acids from starting material having high free fatty acid content. For example, the methods are ineffective when recovering free fatty acids from corn oil produced at an ethanol production facility and waste fats and oils. Oftentimes, these methods include adding alkali to the oil to create free fatty acid soaps. However, the addition of alkali to fats and oils having high free fatty acid content results in an emulsion. The emulsion includes fatty acid soaps and neutral oil and must be further processed to remove these valuable substances. Alternatively, if the emulsion is not processed, the recovery of both fatty acids and neutral oil will be reduced, resulting in a loss of valuable products. Moreover, because previous attempts to remove free fatty acids from fats and oils are directed to refining crude oil, the methods fail to capture free fatty acids as a valuable product.

In one example, United Kingdom Patent Specification No. 427,680 discloses a process for refining vegetable and animal oils and fats. The invention described therein relates to the separation of fatty acid soaps formed by free fatty acids and caustic. The disclosed process addresses the problem of an emulsion by treatment with an alcoholic solution of salts sufficiently concentrated to prevent most oil from going into solution. Effective salts include alkali metal salts such as sodium sulfate, chloride, nitrate, formate, and acetate. The reference argues that the salts prevent neutral oil from dissolving in the alcoholic solution. A similar process is disclosed in United Kingdom Patent Specification No. 1,391,906, which discloses a process for the removal of fatty acids from glyceride oils. The process includes mixing the oil with an aqueous alkaline solution including polyhydric alcohol and sulfonate salt.

In another process, United Kingdom Patent Specification No. 430,381 is directed to the recovery of solvents employed during the refining of oils and fats. The reference discloses the process of neutralizing the oil to produce soapstock and drying the fatty acid soaps in a vacuum prior to adding alcohol to the fatty acid soaps. The addition of the alcohol to the dried soapstock forms three layers: neutral oil, soap, and a layer of emulsion. The emulsion layer must then be processed to remove soaps. This process is inefficient in that it requires the steps of drying the fatty acid soaps and processing the emulsion.

Another process, disclosed in United Kingdom Patent Specification No. 596,871 is directed to the refining of vegetable glyceride oils and fats, particularly cottonseed oil. Crude oil having low free fatty acid content is neutralized in the presence of low concentrations of alcohol. The method disclosed therein is particularly applicable to oils having a high content of non-fatty substances, considerable coloring matter, and free fatty acid content around 1-2%. Accordingly, the process is not well-suited for fats and oils having high free fatty acid content and/or low amounts of non-fatty substances and coloring matter. Specifically, the process disclosed therein results in greater neutral oil loss as free fatty acid content increases.

Another reference, U.S. Pat. No. 6,399,802 provides a method for soapstock acidulation. The method includes adding both a monohydric alcohol to soapstock to lower its viscosity and a strong acid which hydrolyzes the fatty acid soaps. The acidulated fatty acids may then be converted to esters utilizing the alcohol already present in the solution, as well as catalysts already present in the solution. Effective alcohols include isopropanol, n-propanol, isoamyl alcohol, and fusel oil.

None of the above methods provides an efficient means for recovering the free fatty acids found in fats and oils having high free fatty acid content. In addition, the above-described methods fail to result in low amounts of neutral oil loss, particularly as free fatty acid content is increased. Moreover, none of the above methods may be easily integrated into an ethanol production facility or capitalize on the products and byproducts associated with same.

Crude vegetable oils that are food grade typically have free fatty acid content of about 1% in addition to other non-oil impurities. These vegetable oils when refined through traditional alkali refining will result in process loss or neutral oil loss due to physical and chemical binding of oil with the co-products that are generated in the process. Although the neutral oil loss varies with different processes, there are some generally accepted empirical equations that are used by the producers to help estimate the neutral oil loss. American Oil Chemists' Society (AOCS) official methods Ca 9f-57 and Ca-9a-52 form the basis for calculating the neutral oil loss due to processing and inevitable loss due to the presence of free fatty acids, phosphatides and other impurities. L. Strecker et al, developed an equation specific to the process loss during the alkali refining of crude corn oil. According to this given formula, neutral oil loss for alkali refining of crude corn oil with 12% free fatty acid content is about 11% in addition to the inevitable loss due to removal of free fatty acids, impurities etc. Corn oil having 4% free fatty acid content may have neutral oil loss around 4.5% in addition to the inevitable loss due to removal of free fatty acids, impurities etc. Previous methods provide the principle that as free fatty acid content increases, so does neutral oil loss, such as the example immediately above.

Accordingly, there exists a need in the art for a method to recover free fatty acids and other impurities from high free fatty acid fats and oils. The method should have as little neutral oil loss as possible and should further recover as many free fatty acids from the neutral oil as possible in order to maximize the value of both products. Further, the method should remove other impurities from the starting materials, including but not limited to carotenoids, phytosterols, tocopherols, phospholipids and waxes. Such a method should be easily integrated into an ethanol production facility by taking advantage of products and byproducts associated with same.

SUMMARY OF THE INVENTION

Methods to recover free fatty acids from fats and oils are provided. In a first method, fats and oils having high free fatty acid content, such as greater than 4% by weight are treated with a mixture comprising an aqueous monohydric alcohol to form a low-free fatty acid oily phase and an alcohol phase. The mixture may also comprise an alkali. The aqueous monohydric alcohol has a concentration of at least about 15% alcohol by weight. The alcohol phase is treated with an acid, for example to a pH of below 6, to form an aqueous alcohol phase and a lipid alcohol phase, which includes free fatty acids. The free fatty acids may then be recovered, such as by drying, including by evaporation or distillation. The low-free tatty acid oily phase may be further treated with an acid, a monohydric alcohol, aqueous monohydric alcohol, water, or a combination thereof to remove residual free fatty acid soaps. If optionally recovered, the residual free fatty acid soaps may be added to the alcohol phase for treatment with acid.

Monohydric alcohols used in such a method may include methanol, aqueous methanol, ethanol, aqueous ethanol, propanol, aqueous propanol, isopropanol, aqueous isopropanol, butanol, aqueous butanol, isobutanol, aqueous isobutanol, pentanol, aqueous pentanol, and combinations thereof. For example, the alcohol may be an aqueous ethanol including about 15-55% ethanol by weight. The treatment of fats and oils with a mixture comprising a monohydric alcohol and an alkali may occur at about 25 to 75 degrees Celsius, such as at 65 degrees Celsius, and at about atmospheric pressure. The acid may include carbonic acid, which is formed by treating the alcohol phase with carbon dioxide, such as carbon dioxide produced as a byproduct of ethanol production. Other acids may include sulfuric acid, hydrochloric acid, phosphoric acid, citric acid, oxalic acid, and combinations thereof. Fats and oils amenable to the method may include, but are not limited to, waste fats, waste oils, used cooking oil, choice white grade high acid grease, high acid tallow, corn oil, and combinations thereof. In some embodiments, the fats and oils may be further processed to further remove impurities. In one embodiment, the fats and oils may first be treated with a mixture comprising an alcohol and an acid. In some embodiments, the method of the present invention results in neutral oil loss of less than 10%, such as less than 7%, 3%, or, preferably, less than 2%.

In another method to recover free fatty acids from fats and oils, fats and oils having high free fatty acid content are treated with a mixture consisting essentially of an aqueous alcohol and an alkali to form a low-free fatty acid oily phase and an alcohol phase. The aqueous alcohol may have a concentration of at least about 15% alcohol by weight. The alcohol phase may be treated with acid to form an aqueous alcohol phase and a lipid alcohol phase, which includes free fatty acids. The free fatty acids are then recovered from the lipid alcohol phase.

Also provided is a method to recover free fatty acids from corn oil having a free fatty acid content of at least 4%. The corn oil is treated with a mixture comprising an aqueous alcohol and an alkali to form a low-free fatty acid oily phase and an alcohol phase. The aqueous alcohol is selected from the group consisting of aqueous methanol, aqueous ethanol, aqueous propanol, aqueous isopropanol, aqueous butanol, aqueous isobutanol, aqueous pentanol, and combinations thereof. Furthermore the aqueous alcohol has a concentration comprising at least about 15% alcohol by weight. In one embodiment, the aqueous monohydric alcohol is aqueous ethanol comprising about 15-55% ethanol by weight. The alkali may include, but is not limited to, sodium hydroxide, potassium hydroxide, magnesium hydroxide, calcium hydroxide, lithium hydroxide, sodium amide, ammonia, and combinations thereof. The alcohol phase may be treated with acid to form an aqueous alcohol phase and a lipid alcohol phase. The acid may include, but is not limited to sulfuric acid, hydrochloric acid, phosphoric acid, citric acid, oxalic acid, and carbonic acid. Carbonic acid may be formed by treating the alcohol phase with carbon dioxide. Fatty acids are recovered from the lipid alcohol phase.

In addition, a method is provided to recover free fatty acids from corn oil produced in an ethanol production facility. The method includes collecting corn oil produced in an ethanol production facility and having free fatty acid content of at least 4%. The corn oil is treated with a mixture comprising an aqueous ethanol having a concentration of at least 15% ethanol by weight and an alkali. The alcohol phase comprises free fatty acid soaps and may be treated with acid. Accordingly, an aqueous alcohol phase and a lipid alcohol phase are formed. The lipid alcohol phase comprises fatty acids, which may then be recovered.

In yet another similar method to recover free fatty acids from corn oil produced in an ethanol production facility and having a free fatty acid content of at least 4%, the corn oil is treated with a mixture comprising an aqueous ethanol having a concentration of at least about 15% ethanol by weight and an alkali to form a low-free fatty acid oily phase and an alcohol phase. The alcohol phase may be treated with carbon dioxide to form an aqueous alcohol phase and a lipid alcohol phase. The lipid alcohol phase comprises free fatty acids which may be recovered.

DETAILED DESCRIPTION

The following is a detailed description of embodiments of a method 100, for recovering free fatty acids from fats and oils. Fats and oils amenable to such a method may include but are not limited to corn oil, such as corn oil produced in an ethanol plant, high acid grease, high acid tallow, bleachable fancy tallow, fancy tallow. A tallow, prime tallow, special A tallow, No. 2 tallow, yellow grease, flotation oils/greases from animal processing plant wastewater streams, fatty acid streams from biodiesel plants, acidulated soapstock oils and waste frying grease. These fats and oils are generally inedible. Moreover, fats and oils that have become rancid and unsalable at least in part because of the free fatty acid content may be subjected to this method to create valuable, salable products. The disclosed methods have the advantage of being simple yet highly effective at recovering free fatty acids while minimizing neutral oil loss and emulsion formation. Furthermore, in some embodiments, the disclosed methods have the benefit of capitalizing on products and byproducts of an ethanol production facility. Accordingly, one use of the disclosed method 100 is for the recovery of free fatty acids from corn oil and particularly corn oil obtained as a byproduct of ethanol production. For ease of discussion and understanding, the following detailed description and illustrations often refer to the method for use with corn oil. It should be appreciated that the method 100 of the present invention may be used with any fats and oils of animal or vegetable origin.

Figure 1:
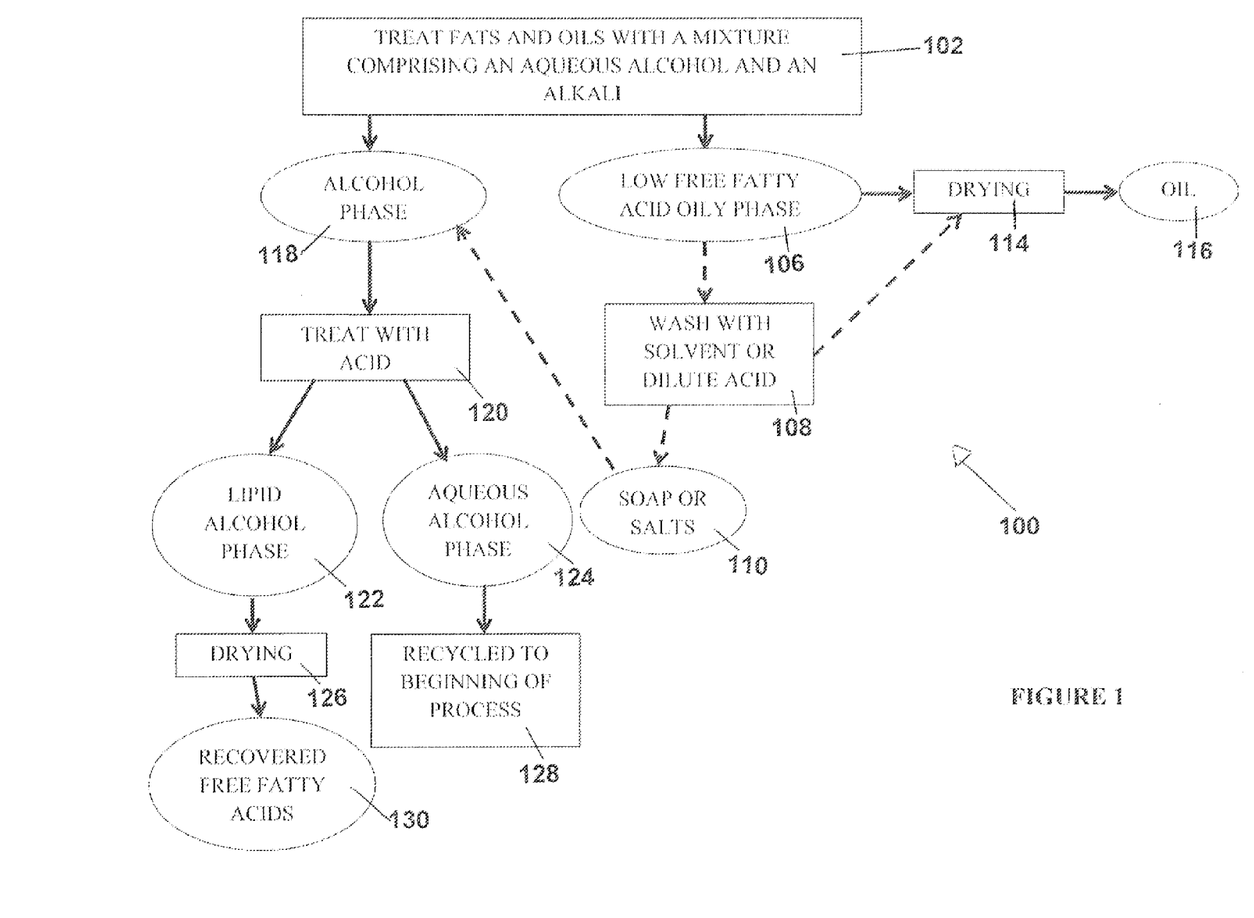
FIG. 1 is a flow chart according to one or more examples of a first embodiment of a method to recover free fatty acids from fats and oils of the present invention.

Referring to FIG. 1, a method 100 for recovering free fatty acids from fats and oils is provided. As shown by block 102, the method begins by treating fats and oils with a mixture comprising an alcohol and an alkali. In the illustrated embodiment, the alcohol is an aqueous alcohol. The alcohol, preferably aqueous alcohol, may also be referred to as the solvent. As mentioned above and discussed in further detail below, the alcohol is advantageous for effecting separation of an alcohol phase 118 and, in some embodiments, residual fatty acid soaps, from a low free fatty acid oily phase 106. The alkali is advantageous for converting free fatty acids to free fatty acid soaps. The treatment results in a low free fatty acid oily phase 106 and an alcohol phase 118. Free fatty acids can also be extracted from crude fats and oils by using aqueous alcohols alone. This is based on the preferential solubility of free fatty acids in the alcohols over neutral oil. In order to sufficiently remove free fatty acids, this method requires a considerably large amount of an alcohol. Alcohols such as methanol, ethanol, propanol, isopropanol, butanol, isobutanol, pentanol, and combinations thereof may be used for this purpose. Laboratory tests show that the process requires about 4-5 times as much weight of alcohol to extract 15% free fatty acids from distillers corn oil than when alkali is also used. When alkali is used, the solvent to oil ratio may be about 0.4-0.6. Recovery of solvent back into the process, although energy intensive, can be easily done with a simple flash distillation due to high difference in the boiling points of the solvent and oil. Moreover, the use of high amounts of solvent also increases the amount of neutral oil loss with the alcohol phase to about 5%, which is likely due to the solubility of oil in high volumes of alcohol. Although this is considerably less than the traditional refining methods, employing an alkali results in even further decreased neutral oil loss, as will be discussed hereinbelow. Accordingly, as provided in FIG. 1, in the preferred embodiment, a mixture comprising both an alcohol and an alkali is employed. Suitable alkalis include, but are not limited to, hydroxides, oxides, carbonates, amines, and amides. For example, sodium hydroxide, potassium hydroxide, magnesium hydroxide, calcium hydroxide, lithium hydroxide, sodium amide, or ammonia may be used. Oftentimes, sodium hydroxide may be used due to its lower cost.

As discussed, above, acceptable alcohols include but are not limited to monohydric alcohols such as methanol, ethanol, propanol, isopropanol, butanol, isobutanol, pentanol, and combinations thereof. Due to the difference in polarity of the aforementioned alcohols and neutral oil, these alcohols are less soluble with oil, leading to decreased neutral oil loss. In general, the alcohol reduces and/or eliminates the emulsion that can be formed when free fatty acids react with alkalis in only water as a solvent, thus effecting clean separation of the low-free fatty acid oily phase and alcohol phase. This provides the advantage of decreasing neutral oil loss while increasing the percentage of free fatty acids that are recovered in the method 100. In some embodiments, the method of the present invention results in neutral oil loss of less than 10%, such as less than 7%, 3%, or, preferably, less than 2%. Ideally, neutral oil loss is as close to 0% as possible. However, some neutral oil loss is often inevitable. As discussed above, previous methods provide a greater neutral oil loss as free fatty acid content of the starting oil increases. As compared to the prior art, methods of the present invention provide a constant, low neutral oil loss for fats and oils with any amount of free fatty acids. Accordingly, while there may be some fluctuation in resulting neutral oil loss among types of oil, neutral oil loss remains generally constant for a particular type of oil. In addition, fluctuation in neutral oil loss for oils with varying contents of free fatty acids is minimized.

The alkali and free fatty acids react in a 1:1 mole ratio. Accordingly, for each mole of free fatty acids, one mole of alkali should be added. The free fatty acid content of the starting oil may be obtained in the laboratory by methods known in the art, such as titration. In embodiments directed to corn oil obtained from an ethanol plant, it is anticipated that the free fatty acid content will generally be consistent in oils received from the same plant. The solvent to oil ratio is preferably about 0.6 by volume, although it is anticipated that other ratios will be effective. As discussed below in Example 7, lower ratios may result in higher neutral oil loss. On the other hand, employing as little solvent as possible is effective and provides for cost savings in the process. Moreover, if too little solvent is used, then an emulsion will occur, which results in neutral oil loss. Furthermore, this step may occur at temperatures of about 25-75 degrees Celsius and at about atmospheric pressure, such as with the reaction occurring at about 65 degrees Celsius at about atmospheric pressure. To some extent, the temperature range may be limited at the top by the boiling point of the alcohol, such as approximately 78 degrees Celsius at about atmospheric pressure for ethanol, while temperatures below about 25 degrees Celsius may lead to difficulty separating the low-free fatty acid oily phase and the alcohol phase in some circumstances.

In the exemplary embodiment disclosed herein, the method 100 is used for the treatment of corn oil produced at an ethanol plant. Accordingly, ethanol or aqueous ethanol, is used as a solvent. Aqueous ethanol with an ethanol concentration of greater than about 15% by weight is preferred. For example, aqueous ethanols having about 15-55% ethanol by weight are used, such as aqueous ethanol with about 40% by weight ethanol, but it is anticipated that other concentrations will be effective. While an aqueous ethanol with about 40% ethanol is preferred, oftentimes the aqueous ethanol received from an ethanol plant will have a higher ethanol concentration, such as about 55%. This aqueous ethanol is effective in carrying out the claimed methods and can provide cost savings as there is no need to process the aqueous ethanol prior to using same as a solvent. However, it is contemplated that aqueous alcohols with a lower ethanol concentration may be more effective in preventing neutral oil loss. This is because neutral oil is more easily dissolved in aqueous ethanol with higher ethanol concentrations. Moreover, due to the polarity of oil and water, the presence of water reduces the solubility of oil in ethanol. Accordingly, aqueous alcohols with lower ethanol concentrations may result in decreased neutral oil loss. However, alcohol concentrations below 15% may not be effective in breaking the emulsion, and, as a result, neutral loss will increase.

As discussed above, the addition of the alcohol and alkali will result in two phases being formed: an alcohol phase 118 and a low free fatty acid oily phase 106. The low free fatty acid oily phase 106 will include neutral oil but may also include residual impurities, including residual free fatty acid soaps, the optional recovery of which will be discussed below. The alcohol phase 118 will include free fatty acid soaps, ethanol, water, and any impurities present in the oil, such as carotenoids, phytosterols, tocopherols, phytostanols, polyphenols, phospholipids, waxes, and/or other impurities, that have preferential solubility in the aqueous ethanol solvent phase.

The above treatment, which includes a reaction and an extraction, may be exploited in many different fashions, including but not limited to a batch system, a continuous stirred-tank reactor (CSTR), and continuous flow in a tubular or pipe system. For example, the treatment may occur in a continuous tubular system, such as a carbon steel pipe containing at least one static mixer to effect mixing of the alkali and free fatty acids, as well as the free fatty acid soaps and aqueous ethanol. In one laboratory scale example, this step 102 of the method 100 may be carried out in an eleven inch carbon steel pipe having a one half inch diameter. The pipe includes one static mixer with 12 elements for effective mixing of the substances. It is anticipated that this laboratory reactor is one tenth the size of an industrial system that would be employed at a 50 million gallon per year ethanol plant. The described laboratory reactor will handle oil at 1200 million which will correspond to three gallons per minute rate of oil at the industrial scale.

In the preferred continuous tubular system, the low free fatty acid oily phase 106 and alcohol phase 118 flow into a decanter and are allowed to separate into two layers by settling for 15-30 minutes. Alternatively, the low free fatty acid oily phase 106 and alcohol phase 118 may be separated by any means known in the art, now or in the future, including but not limited to flowing the mixture of low free fatty acid oily 106 and alcohol 118 phases to a liquid-liquid centrifuge to be continuously separated into two phases. When using a decanter, as the layers settle, they are continuously drained or pumped from the decanter.

As discussed above and shown in FIG. 1, after drawing off the low free fatty acid oily phase 106, it may optionally be further processed. In one embodiment, the phase 106 may be washed with solvent or acid, as shown in block 108. Suitable acids include both inorganic and organic acids, such as sulfuric acid, hydrochloric acid, phosphoric acid, citric acid, oxalic acid, and carbonic acid. In one embodiment, carbonic acid is obtained by treating the low-free fatty acid oily phase with carbon dioxide. Advantageously, carbon dioxide is a byproduct of ethanol production. The acid was results in salts and washed, low free fatty acid oil, which may be dried, as shown in block 114. As discussed above, the oil 116 is a valuable product. In another embodiment, the low free fatty acid oily phase 106 may be dried without washing, as shown by block 114 to produce valuable oil 116. In most embodiments, the low-free fatty acid oily phase 106 need not be processed to remove residual free fatty acid soaps, as the oil in the low-free fatty acid oily phase 1116 meets many required specifications for sale as a valuable product.

Alternatively, the low free fatty acid oily phase 106 may be washed with the alcohol solvent to remove residual soaps, as shown by block 108. Although water may be effective, its use alone tends to create emulsions. However, the addition of alcohol to the water to create an aqueous alcohol for washing the oil phase reduces or eliminates the emulsion than can be formed when the oil phase is mixed with water alone. As discussed above the alcohol effects clean separation of the oil from free fatty acid soaps. For example, the same solvent that is used in the initial treatment step, such as aqueous ethanol with about 40-60% ethanol, may be used to wash the oil phase. The residual free fatty acid soaps recovered from the oil phase may be added to the alcohol phase 118 for further processing with same. The washed oil may then be processed, such as by drying 114 to remove the solvent, to recover the valuable neutral oil 116. The neutral oil 116 may be used for animal feed, industrial purposes including but not limited to lubricants, biodiesel, polymers, and paints, and potentially food.

As shown by block 120 of FIG. 1, the alcohol phase from the first step is treated with acid to form a lipid alcohol phase 122 and an aqueous alcohol phase 124. In the preferred embodiment, the acid is added until the pH of the mixture is 6 or below, preferably about 2. Suitable acids include both organic and inorganic acids. For example, sulfuric acid, hydrochloric acid, phosphoric acid, citric acid, oxalic acid, acetic acid, and carbonic acid may be used. As discussed above, carbonic acid may be obtained from carbon dioxide, which is produced as a byproduct of ethanol production. As much as seventeen pounds of carbon dioxide is produced per bushel of corn processed at an ethanol plant. Accordingly, carbon dioxide is an inexpensive or free, readily available substance at ethanol production plants. Some ethanol plants release this carbon dioxide into the atmosphere, while others capture it for sale. As carbon dioxide is a greenhouse gas, using the carbon dioxide in the method such that the release of carbon dioxide into the air is eliminated or reduced helps reduce greenhouse gas emissions and is, accordingly, an environmentally friendly process. Moreover, carbon dioxide in the presence of water acts as carbonic acid. This acid will convert, or acidulate, free fatty acid soaps to free fatty acids and corresponding carbonate salts. When the preferred aqueous ethanol described above is used, water is already present in the alcohol phase 118 for reacting with carbon dioxide to create acid. It is anticipated that other substances could be added at this time as desired. Carbon dioxide acidulation provides the benefit of reducing or eliminating the use of strong acids, such as sulfuric acid, which may otherwise be necessary for acidulation of the free fatty acid soaps.

This step 120 of the method 100 may also be exploited in many different fashions, including but not limited to a batch system, a continuous stirred-tank reactor (CSTR), and continuous flow in a tubular or pipe system. In embodiments employing carbon dioxide, the treatment step with same is preferably carried out in a high pressure reactor, although it is anticipated that other systems may be used. Beneficial to the process, a high pressure reactor is air tight, which prevents the gaseous carbon dioxide from escaping. In one embodiment, carbon dioxide is collected as it is released in the ethanol production process and bubbled to the alcohol phase. After the carbon dioxide treatment step, the resulting lipid alcohol phase and aqueous alcohol phase may be collected in a decanter, where the phases are allowed to settle for 15-30 minutes before being separately drawn off. Alternatively, the separation of the phases may be effected by a liquid-liquid centrifuge or other means known in the art now or in the future, but due to the pH of the output, it is often desirable to use other means to separate the two phases. For example, the low pH of the output may corrode some centrifuges. The aqueous alcohol phase 124 generally includes ethanol, water, and salts. The lipid alcohol phase 122 primarily includes ethanol, free fatty acids, and water.

The lipid alcohol phase may be processed to recover the free fatty acids contained therein. In the preferred embodiment, the lipid alcohol phase 122 is dried, as shown by block 126. Processes such as evaporation or distillation may be used to recover the free fatty acids. Accordingly, the method results in recovered free fatty acids 130. It is anticipated that the disclosed method will result in high recovery of free fatty acid with low neutral oil loss. In some embodiments, neutral oil loss may be 2% or lower. Once the alcohol present in the lipid alcohol phase 122 has been separated from the recovered free fatty acids 130, it may be reused if desired, but may require dilution with water to obtain the appropriate concentration. In addition, the aqueous alcohol phase 124 may be recycled to the beginning of the process, as shown in block 128.

Figure 2:
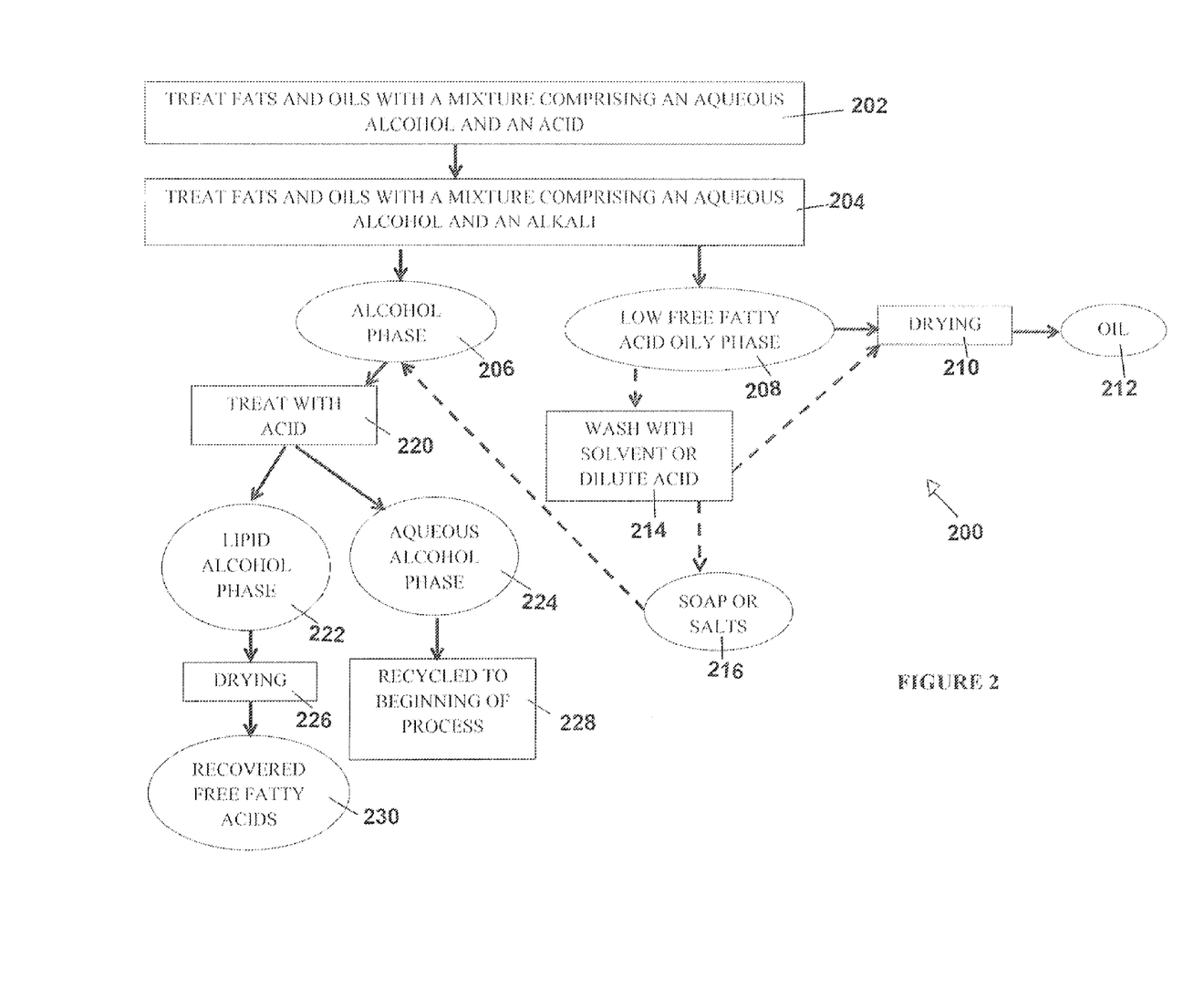
FIG. 2 is a flow chart according to one or more examples of a second embodiment of a method to recover free fatty acids from fats and oils of the present invention wherein the fats and oils are first treated with an alcohol and an acid to remove impurities in the fats and oils.

Referring to FIG. 2, a second embodiment of a method 200 to recover free fatty acids from fats and oils is provided. The embodiment begins by treating fats and oils with a mixture comprising an aqueous alcohol and an acid, as shown in block 202. This embodiment is advantageous for waste fats and oils that originate from oils such as soybean oil and canola oil that contain impurities such as phospholipids. The aqueous alcohol and acid effectively hydrates all the phospholipids and separates them from the fats and oils. If fats and oils containing phospholipids are not subjected to an acid treatment process, they would interfere with the free fatty acid extraction process and thus increase the neutral oil loss. Specifically, the presence of phospholipids results in an emulsion layer that entraps neutral oil. In the current method, the addition of alcohol reduces or eliminates the need to remove the phospholipids from the resulting mixture or phase containing same prior to proceeding with the process. Rather, the phospholipids are solubilized in an alcohol phase, resulting in better separation from the other valuable products.

As provided in block 204 of FIG. 2, a mixture comprising an aqueous alcohol and alkali is then added to the mixture resulting from step 202. In some embodiments, it may not be necessary to add further alcohol, and only an alkali will be added at this step. As discussed above, the alkali converts the free fatty acids present in the fats and oils into free fatty acid soaps. The alcohol, which is preferably an aqueous alcohol, helps to effect clean separation of an alcohol phase 206 and low-free fatty acid oily phase 208.

The remaining steps of the second embodiment of a method 200 to recover free fatty acids from fats and oils are similar to that of the first-described embodiment of a method of the present invention. Namely, the low free fatty acid oily phase 208 may be washed with acid or solvent, as shown in block 214 to produce salts or soap 216, respectively, and oil 218. The washed, low free fatty acid oil may be dried 210 to produce valuable neutral oil 212. In addition, as shown by block 210 of FIG. 2, the low free fatty acid oily phase 208 may be dried to produce oil 212 without undergoing a wash step. The alcohol phase 206 may be treated with acid 220 to produce a lipid alcohol phase 222 and an aqueous alcohol phase 224. The lipid alcohol phase 222 may be processed, such as by drying 226, to produce recovered free fatty acids 230. The aqueous alcohol phase 224 may be recycled to the beginning of the process, as shown in block 228.

Figure 3:
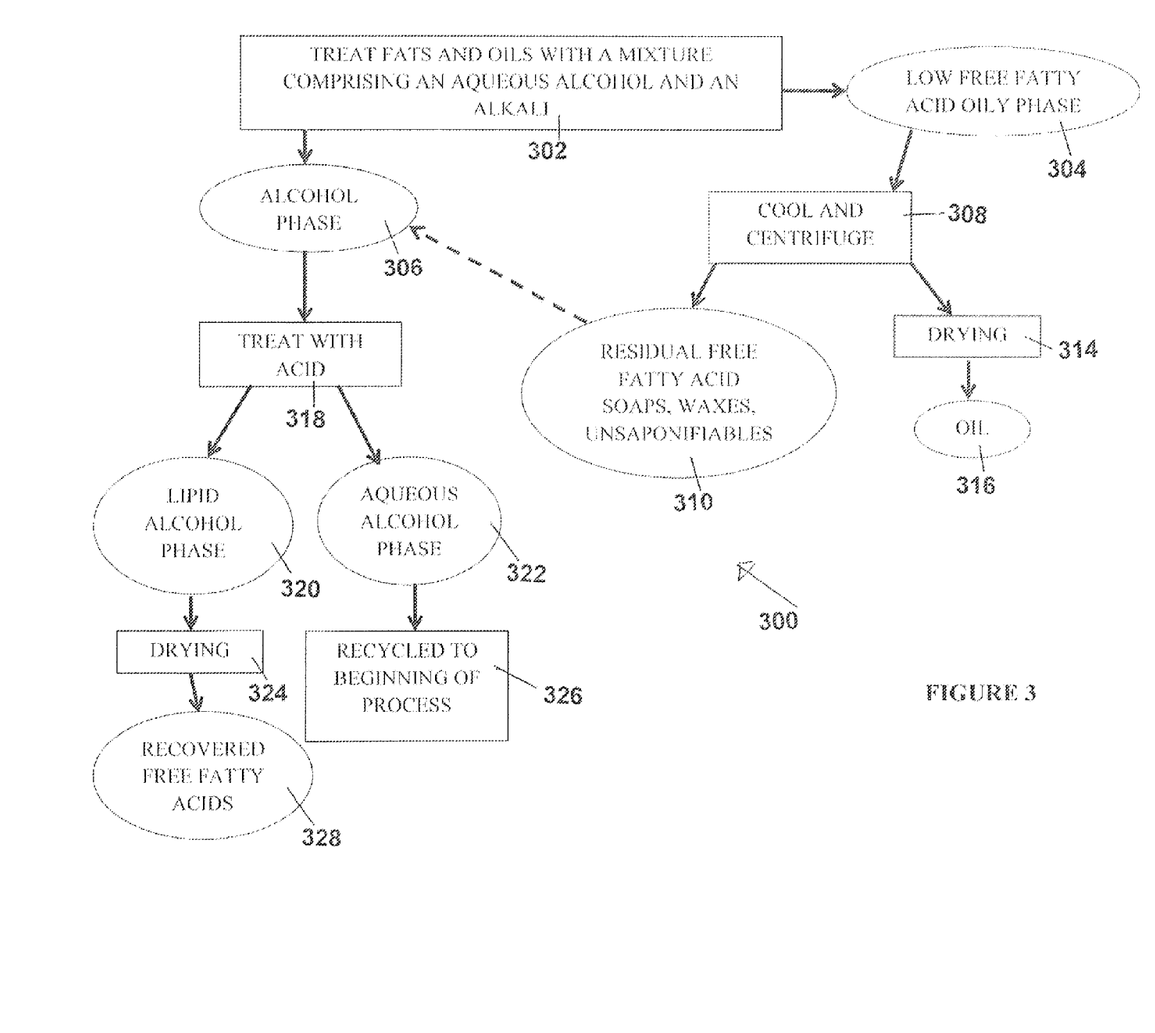
FIG. 3 is a flow chart according to one or more examples of a third embodiment of a method to recover free fatty acids from fats and oils of the present invention wherein low free fatty acid oil is cooled and centrifuged to remove residual fatty acid soaps, waxes, and unsaponifiables.

In a third embodiment of a method 300 for recovering free fatty acids from fats and oils, the low free fatty acid oily phase 304 may be further processed to remove waxes, unsaponifiables, and residual fatty acid soaps. The dewaxing method 300 begins by treating fats and oils with a mixture comprising an aqueous alcohol and an alkali, as shown by block 302. This treatment results in an alcohol phase 306 and a low-free fatty acid oily phase 304. The low-free fatty acid oily phase 304 may be cooled and centrifuged, as shown by block 308. By cooling the low-free fatty acid oily phase 304, impurities such as residual free fatty acid soaps, waxes, and unsaponifiables may precipitate out of the mixture. Centrifugation then allows separation of these impurities 310 from the oil 312. The resulting low free fatty acid oil exiting the centrifuge may be dried, as shown by block 314 to produce oil 316. The oil 312 may be processed as discussed above, such as with a dilute acid wash 314 to produce dewaxed oil 316.

The residual fatty acid soaps, waxes, and unsaponifiables shown in block 310 may be mixed with the alcohol phase 306 for further processing or may be processed separately. Namely, the alcohol phase 306 is treated with acid, as shown by block 318. This step 318 creates a lipid alcohol phase 320 and an aqueous alcohol phase 322. The lipid alcohol phase 320 may be processed to recover recovered free fatty acids 328, such as by drying 324. The aqueous alcohol phase 322 may be recycled to the beginning of the process, as shown by block 326.

It will be appreciated by one skilled in the art that a number of other processing steps known in the art, either now or in the future, may be employed in a method of the present invention. In one example, a bleaching agent may be used. Waste fats and oils are generally dark in color due to the presence of impurities. Previous methods to bleach these fats and oils have included the use of bleaching clays. In methods of the present invention, fats and oils may be treated with a mixture comprising an alcohol, alkali, and bleaching agent. A liquid or dissolved bleaching agent is preferred. The bleaching agent will remove color from the resulting oil. Similar to the above-described methods, this treatment results in an alcohol phase and a low free fatty acid oily phase. The phases may be processed as discussed above to produce oil, recovered free fatty acids, and aqueous alcohol that may be recycled to treat further fats and oils. Suitable bleaching agents include, but are not limited to, hypochlorite, peroxide, chlorite, and peroxyacid. Namely, sodium hypochlorite, benzoyl peroxide, hydrogen peroxide, per-acetic acid, sodium percarbonate, sodium perborate, and sodium borohydride may be used.

Figure 4:
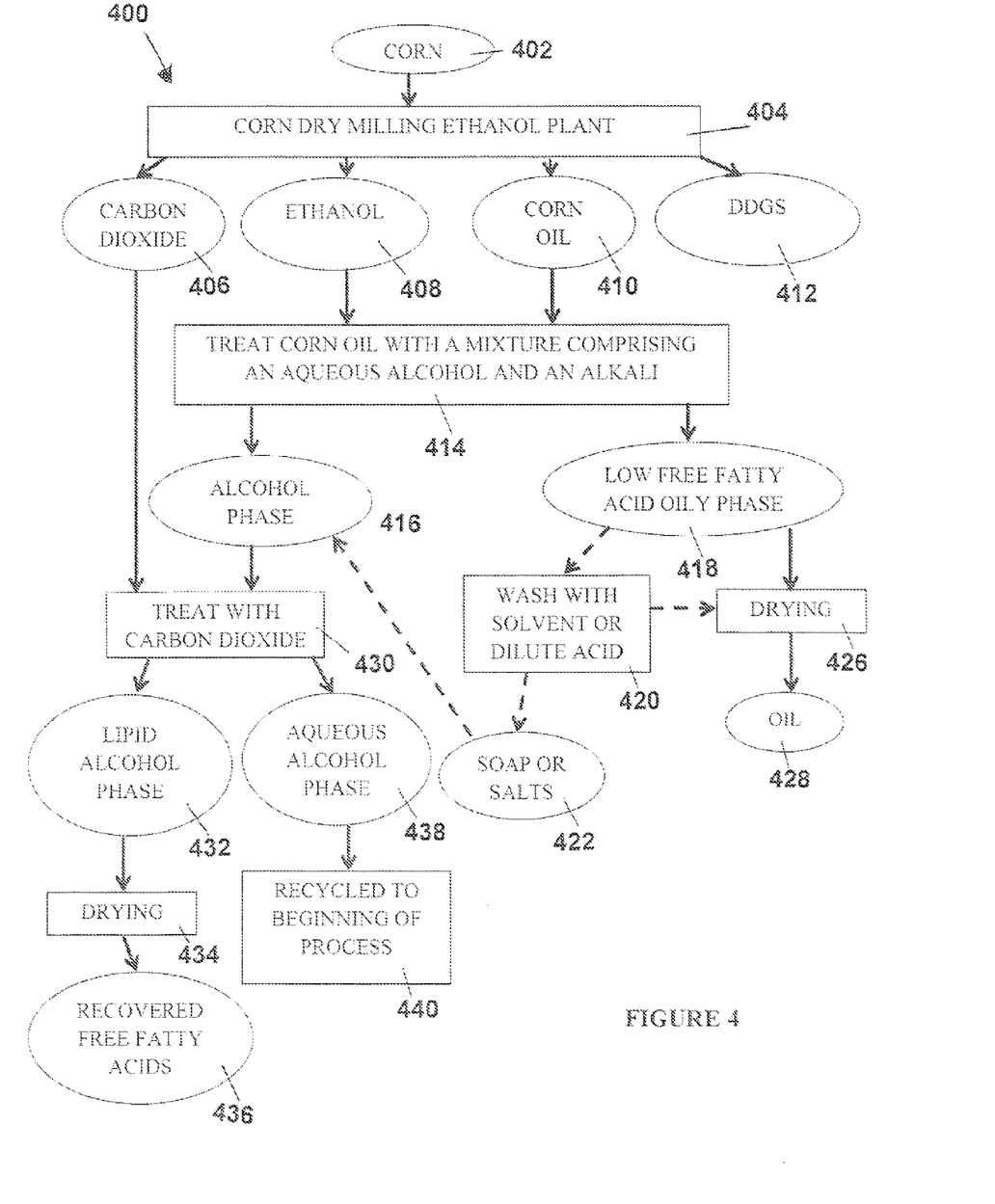
FIG. 4 is a flow chart according to one or more examples of a fourth embodiment of a method to recover free fatty acids from fats and oils of the present invention wherein the method takes place at an ethanol production facility to recover free fatty acids from corn oil and also takes advantage of other products of ethanol production, including aqueous ethanol and carbon dioxide.

Referring to FIG. 4, a fourth embodiment of a method 400 to recover free fatty acids from fats and oils begins with corn 402 at a corn dry milling ethanol plant 404. The corn dry milling ethanol plant 404 process produces at least four products: carbon dioxide 406, ethanol 408, corn oil 410, and dried distillers grains with solubles (DDGS) 412. As discussed above, the method 400 of the present invention may be used to recover free fatty acids from fats and/or oils with high free fatty acid content, and in particular the illustrated corn oil 410. As shown in block 414, the oil is treated with a mixture comprising the aqueous ethanol and an alkali. Suitable alkalis are as discussed above. This treatment results in an alcohol phase 416 and a low-free fatty acid oily phase 418. The low free fatty acid oily phase 418 may be treated to recover valuable neutral oil 428. For example, the low-free fatty acid oily phase 418 may be washed with solvent or dilute acid, as shown in block 420. The wash may produce soaps or salts 422, respectively. Optionally, the soap or salts may be added to the alcohol phase 416. In other embodiments, the low-free fatty acid oily phase 418 may instead be dried 426 immediately to produce valuable neutral oil 428. It is anticipated that in many embodiments, the low-free fatty acid oily phase 418 will be of a high enough quality that only drying 426 is necessary to produce a salable product.

The alcohol phase 416 may be further processed to recover free fatty acids. Specifically, as shown in block 430 the alcohol phase may be treated with carbon dioxide 406 produced by the ethanol plant 404. As discussed above, carbon dioxide dissolves in water to form carbonic acid, thus serving to acidulate the free fatty acid soaps. It is anticipated that in many embodiments, other organic or inorganic acids will be used. This treatment with acid 430 results in a lipid alcohol phase 432 and an aqueous alcohol phase 438. The lipid alcohol phase 432 may be processed, such as by drying 434 to produce recovered free fatty acids 436. The aqueous alcohol phase 438 may be recycled to treat further corn oil, as shown by block 440.

Example 1

This example illustrates the use of a batch reactor to extract free fatty acids from distillers corn oil (DCO) containing 13.2% free fatty acids. A test reaction was performed where 207.8 grams of DCO was added to a 500 ml flask. The corn oil may also be referred to as feedstock. The temperature of the corn oil was raised from ambient temperature to 65 degrees Celsius. A solvent phase was then prepared for use in the reaction. The solvent phase was prepared by initially creating a solution of aqueous ethanol, containing 40% ethanol by weight. Thereafter, 3.9 grams of sodium hydroxide was added to 127.6 grams of aqueous ethanol. In a separate flask, the solvent phase and alkali were mixed and heated from ambient temperature to 65 degrees Celsius. The alkaline solvent was added to the feedstock and the mixture was then agitated for one minute, after which, the mixture was allowed to separate, in a 65 degree Celsius environment, into two distinct phases. The top phase was collected and dried to yield 179.8 grams of oil with free fatty acid content of 0.2%. 114.6 grams of the bottom solvent phase were collected into a separate beaker to which concentrated sulfuric acid was added until the pH of the mixture was 2. The mixture was then agitated for one minute, after which, it was allowed to separate, in a 65 degree Celsius environment, into two distinct phases. The top phase was separated and dried to yield 27.3 grams of fatty acids. Experimental losses of oil to glassware and other equipment amounted to 4 grams. Yield of free fatty acids may be calculated by measuring the amount of free fatty acids that are recovered as compared to the free fatty acids that are present in the feed stock. Yield of free fatty acids in this example is 98.6%. The neutral oil loss is calculated by measuring the weight of neutral oil in the feedstock minus the weight of neutral oil in the low free fatty acid oil. This example resulted in a 2.1% calculated neutral oil loss.

Example 2

This example illustrates extraction of free fatty acids from used cooking oil (UCO) containing 11.4% free fatty acids using a batch reactor. A test reaction was performed where 202.8 grams of UCO was added to a 500 ml flask and heated to 65 degrees Celsius. The solvent phase was prepared by initially creating a solution of aqueous ethanol, containing 55% ethanol by weight. Thereafter, 3.3 grams of sodium hydroxide were added to 122.6 grams of aqueous ethanol in a separate flask and heated to 65 degrees Celsius. The alkaline solvent was added to the feedstock, and the mixture was then agitated for one minute, after which, the mixture was allowed to separate into two distinct phases. The top phase was collected and dried to yield 175.9 grams of oil with free fatty acid content of 0.2%. 107.6 grams of the bottom solvent phase were collected into a separate beaker to which concentrated sulfuric acid was added until the pH of the mixture was 2. The mixture was then agitated for one minute, after which, it was allowed to separate, in a 65 degree Celsius environment, into two distinct phases. The top phase was separated and dried to yield 25 grams of fatty acids. Experimental losses of oil to glassware and other equipment amounted to 1.4 grams. Yield of free fatty acids in this example is 92%. The neutral oil loss in this example is 1.9%.

Example 3

This example illustrates extraction of free fatty acids from feed grade crude tallow containing 15.8% free fatty acids using a batch reactor. A test reaction was performed where 203.8 grams of UCO were added to a 500 ml flask and heated to 65 degrees Celsius. The solvent phase was prepared by initially creating a solution of aqueous ethanol, containing 40% ethanol by weight. Thereafter, 4.7 grams of sodium hydroxide were added to 125.6 grams of aqueous ethanol in a separate flask and heated to 65 degrees Celsius. The alkaline solvent was added to the feedstock, and the mixture was then agitated for one minute, after which, the mixture was allowed to separate into two distinct phases. The top phase was collected and dried to yield 159.9 grams of tallow oil with free fatty acid content of 0.2%. 120.8 grams of the bottom solvent phase were collected into a separate beaker to which concentrated sulfuric acid was added until the pH1 of the mixture was 2. The mixture was then agitated for one minute, after which, it was allowed to separate, in a 65 degree Celsius environment, into two distinct phases. The top phase was separated and dried to yield 42.5 grams of fatty acids. Experimental losses of oil to glassware and other equipment amounted to 5.4 grams. Yield of free fatty acids in this example is 96%. The neutral oil loss in this example is 6.6%.

Example 4

This example illustrates extraction of free fatty acids from distillers corn oil that is being produced at a commercial corn dry milling ethanol production facility. Distillers corn oil is continuously produced at a rate of 3 gal/min with an average of 15.5 wt % free fatty acids at the ethanol production facility. The corn oil is heated to 65° C. and is passed through a tubular reactor where it is mixed with 1.8 gal/min of 40 wt % ethanol solution that is premixed with 0.3 gal/min of 50 wt % sodium hydroxide. After mixing, the reaction mixture is allowed to mechanically separate into two phases. The top phase of low free fatty acid corn oil is pumped out at a rate of 2.6 gal/min, and the bottom solvent phase is pumped into another tubular reactor where it is mixed with concentrated sulfuric acid until the pH of the mixture is 2. The reaction mixture is further separated into two phases. The top free fatty acid phase is recovered and further dried to remove residual solvent to produce 0.5 gal/min of free fatty acids. Yield of free fatty acids in this example is 96%. The neutral oil loss in this example is 1.4%.

Example 5

Several experiments were conducted in order to determine the effect of alcohol proof. With the exception of the ethanol concentration in the solvent, the experimental procedure followed was similar to that described in the above examples. Ethanol concentrations from 5 wt % up to 100 wt % (absolute alcohol were tested to determine the impact on reaction, separation, neutral oil loss, and free fatty acid yield. In general, different ethanol proofs did not have an impact on the reaction. However, with respect to the separation, when using gravity, ethanol solutions between 15 wt % and 55 wt % resulted in the lowest neutral oil loss along with high yield of free fatty acids. A middle emulsion layer was formed when ethanol solutions below 15 wt % were used. This resulted in higher oil loss due to the entrainment of the oil in the emulsion layer. Using a centrifugal separator, in place of gravity, may eliminate the possibility of forming a middle emulsion layer. Ethanol solutions between 60 wt % and 70 wt % caused convolution of oily phase and alcohol phase due to similar densities. As a result, efficient separation of two phases becomes impossible. Ethanol solutions above 70 wt % resulted in efficient phase separation but resulted in high neutral oil loss due to higher solubility of oil in alcohol phase.

Example 6

Experiments were conducted in order to determine the role of temperature on the reaction, separation, neutral oil loss, and free fatty acid yield. With the exception of the target temperature, the experimental procedure followed was similar to that described in the above examples. The neutralization reaction and the acidulation have been performed between 25° C. and 75° C. at atmospheric pressure. Results indicated that the temperature had minimal impact on the completion of the reaction. However, it was observed that temperature above 50° C. resulted in a quicker and cleaner separation of the two phases resulting in minimal oil loss to the alcohol phase.

Example 7

With intent to use less amount of solvent, several experiments were conducted in order to determine the effect of solvent to oil ratio on reaction, separation, neutral oil loss and free fatty acid yield. With the exception of the amount of solvent used, the experimental procedure followed was similar to that described in the above examples. Solvent to oil ratios from 0.2 up to 0.6 were tested. Test results indicated that solvent to oil ratios below 0.4 impacted reaction, separation, and neutral oil loss. Specifically, solvent ratio of below 0.4 failed to completely extract the free fatty acids from the oil due to incomplete reaction. This could be a result of not enough mixing between solvent and oil phases. This problem can be overcome by using high shear mixers. However, the use of high shear mixers can result in stable emulsions between oil and solvent phases increasing the high neutral oil loss. At solvent ratios below 0.2, in addition to incomplete reaction and fatty acid extraction, a middle emulsion layer was formed which resulted in higher oil loss due to the entrainment of the oil in the emulsion layer. At this ratio there may not be enough ethanol to assist in effective separation of two phases. Using a centrifugal separator, in place of gravity, may eliminate the possibility of forming a middle emulsion layer.

Although various representative embodiments of this invention have been described above with a certain degree of particularity, those skilled in the art could make numerous alterations to the disclosed embodiments without departing from the spirit or scope of the inventive subject matter set forth in the specification and claims. Accordingly, the invention should only be limited as required in the claims below. Joinder references (e.g. attached, adhered, joined) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention unless otherwise required by the claims. It is intended that all matter contained in the above description or shown the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Accordingly, the invention should only be limited as required in the claims below. Listing the steps of a method in a certain order does not constitute any limitation on the order of the steps of the method unless otherwise required by the claims. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements, and/or substantial equivalents consistent with the claims.

The invention claimed is:

1. A method to recover free fatty acids from fats and oils comprising:
   treating fats and oils having a high free fatty acid content with a mixture comprising a monohydric alcohol to form a low-free fatty acid oily phase and an alcohol phase wherein said monohydric alcohol is a solvent;
   said monohydric alcohol having a concentration of at least about 15% alcohol by weight;
   treating said alcohol phase with an acid to form an aqueous alcohol phase and a lipid alcohol phase, wherein said lipid alcohol phase comprises free fatty acids; and
   recovering fatty acids from said lipid alcohol phase.

2. The method of claim 1 wherein said mixture comprising a monohydric alcohol further comprises an alkali.

3. The method of claim 2 wherein said low-free fatty acid oily phase is further treated with at least one of a monohydric alcohol, aqueous monohydric alcohol, water, acid, or a combination thereof.

4. The method of claim 2 wherein said monohydric alcohol is selected from the group consisting of methanol, aqueous methanol, ethanol, aqueous ethanol, propanol, aqueous propanol, isopropanol, aqueous isopropanol, butanol, aqueous butanol, isobutanol, aqueous isobutanol, pentanol, aqueous pentanol, and combinations thereof.

5. The method of claim 4 wherein said alcohol is an aqueous alcohol comprising about 15% to 55% ethanol by weight.

6. The method of claim 2 wherein said the step of treating said fats and oils with a mixture comprising an alcohol and an alkali to form a low-free fatty acid oily phase and an alcohol phase is carried out at about 25 to 75 degrees Celsius and about atmospheric pressure.

7. The method of claim 6 wherein the step of treating said fats and oils with a mixture comprising an alcohol and an alkali to form a low-free fatty acid oily phase and an alcohol phase is carried out at about 65 degrees Celsius.

8. The method of claim 2 wherein said acid is selected from the group consisting of carbonic acid formed by treating said alcohol phase with carbon dioxide, sulfuric acid, hydrochloric acid, phosphoric acid, citric acid, oxalic acid, and combinations thereof.

9. The method of claim 2 wherein said fats and oils are selected from the group consisting of waste fats, waste oils, high acid grease, high acid tallow, corn oil, used cooking oil and combinations thereof.

10. The method of claim 2 wherein said fats and oils are first treated with a mixture comprising an alcohol and an acid.

11. The method of claim 2 wherein said fatty acids are recovered by using a process selected from the group consisting of drying, evaporation, distillation, and combinations thereof.

12. The method of claim 2 wherein said acid is added to said alcohol phase until the pH of said alcohol phase is at least 6.

13. The method of claim 2 wherein said acid is added to said alcohol phase until the pH of said alcohol phase is 2.

14. The method of claim 2 wherein said fats and oils have a free fatty acid content of at least 4%.

15. The method of claim 2 wherein the neutral oil loss of the process is less than 10%.

16. The method of claim 15 wherein the neutral oil loss of the process is less than 3%.

17. The method of claim 2 wherein the ratio of aqueous monohydric alcohol to oil is about 0.4-0.75.

18. A method to recover free fatty acids from fats and oils comprising:
   treating fats and oils having a high free fatty acid content with a mixture consisting essentially of an aqueous alcohol and an alkali to form a low-free fatty acid oily phase and an alcohol phase and wherein said aqueous alcohol is a solvent;
   treating said alcohol phase with an acid to form an aqueous alcohol phase and a lipid alcohol phase, wherein said lipid alcohol phase comprises free fatty acids; and
   recovering fatty acids from said lipid alcohol phase;
   wherein said aqueous alcohol has a concentration of at least about 15% alcohol by weight.

19. A method to recover free fatty acids from corn oil comprising:
   said corn oil having a free fatty acid content of at least 4%;
   treating said corn oil with a mixture comprising an aqueous alcohol and an alkali to form a low-free fatty acid oily phase and an alcohol phase and wherein
   said aqueous alcohol is a solvent;
   treating said alcohol phase with an acid to form an aqueous alcohol phase and a lipid alcohol phase, wherein said lipid alcohol phase comprises free fatty acids; and
   recovering fatty acids from said lipid alcohol phase;
   wherein said aqueous alcohol is selected from the group consisting of aqueous methanol, aqueous ethanol, aqueous propanol, aqueous isopropanol, aqueous butanol, aqueous isobutanol, aqueous pentanol, and combinations thereof; and
   wherein said aqueous alcohol has a concentration comprising at least about 15% alcohol by weight.

20. The method of claim 19 wherein said aqueous alcohol is an aqueous ethanol comprising about 15% to 55% ethanol by weight.

21. The method of claim 19 wherein said alkali is selected from the group consisting of sodium hydroxide, potassium hydroxide, magnesium hydroxide, calcium hydroxide, lithium hydroxide, sodium amide, ammonia, and combinations thereof.

22. The method of claim 19 wherein said acid is selected from the group consisting of sulfuric acid, hydrochloric acid, phosphoric acid, citric acid, oxalic acid, carbonic acid produced by treating said alcohol phase with carbon dioxide, and combinations thereof.

23. A method to recover free fatty acids from corn oil produced in an ethanol production facility comprising:
   collecting corn oil produced in an ethanol production facility, said corn oil having a free fatty acid content of at least 4%;
   treating said corn oil with a mixture comprising an aqueous ethanol having a concentration of at least about 1.5% percent ethanol by weight and an alkali to form a low-free fatty acid oily phase and an alcohol phase and wherein said aqueous alcohol is a solvent;
   said alcohol phase comprising free fatty acid soaps;
   treating said alcohol phase with an acid to form an aqueous alcohol phase and a lipid alcohol phase, said lipid alcohol phase comprising free fatty acids; and
   recovering said free fatty acids.

24. A method to recover free fatty acids from corn oil produced in an ethanol production facility comprising:
   collecting corn oil produced in an ethanol production facility, said corn oil having a free fatty acid content of at least 4%;
   treating said corn oil with a mixture comprising an aqueous ethanol having a concentration of about at least 15% percent ethanol by weight and an alkali to form a low-free fatty acid oily phase and an alcohol phase and wherein said aqueous alcohol is a solvent;

said alcohol phase comprising free fatty acid soaps;
treating said alcohol phase with carbon dioxide to form an aqueous alcohol phase and a lipid alcohol phase, said lipid alcohol phase comprising free fatty acids; and
recovering said free fatty acids.

* * * * *